J. M. Mott, Jr.,
Sawing Stone.
N° 15,383.  Patented July 22, 1856.
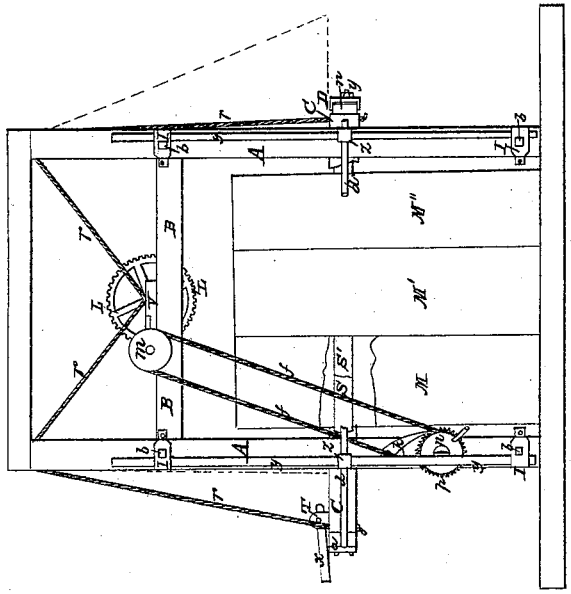
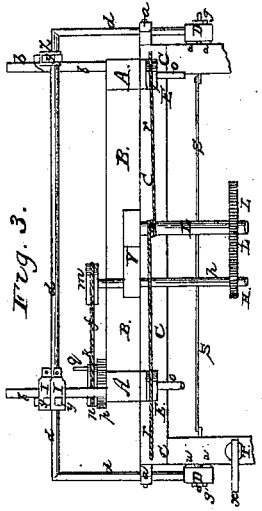
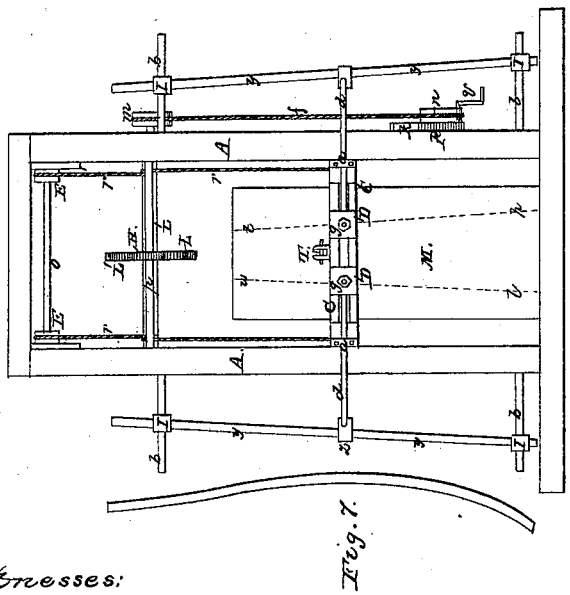
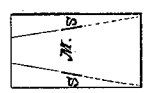
Witnesses:
James W. Hills
Joseph H. Coomstock
Inventor.
John M. Mott Jr.

UNITED STATES PATENT OFFICE.

JNO. M. MOTT, JR., OF LANSINGBURGH, NEW YORK.

MARBLE-SAWING MACHINE.

Specification of Letters Patent No. 15,383, dated July 22, 1856.

*To all whom it may concern:*

Be it known that I, JOHN M. MOTT, Jr., of Lansingburgh, in the county of Rensselaer and State of New York, have invented new and useful Improvements on Marble-Sawing Machines, by which improvements I am enabled to saw two or more sides of a plain or curved wedge-shaped solid at the same time; and I do hereby declare that the following is a full, clear, and exact description of the construction and operation of the same, reference being had to the annexed drawings and the letters of reference marked thereon, making a part of this specification, in which—

Figure 1 is an end elevation; Fig. 2 a partial side elevation; Fig. 3 one half of the plan and Figs. 4, 5, 6, and 7 detail and sectional drawings.

The nature of my invention consists in providing one or more saws of a gang of saws with adjustable guide bars, guide rods, and slides, so that while the whole gang is in reciprocating motion the saws with the adjustable guide bars, guide rods, and slides attached will gradually, laterally approach or recede or approach and recede from each other or from the stationary saws of the gang of saws.

To enable others skilled in the art to make and use my invention I will proceed to describe its construction and operation.

I construct a machine in the usual manner with the four posts A, A, A, A, and the two cross beams B, B, which are placed near the top of the posts A, A, A, A; on each of the cross beams B, I place a box V for bearings for the shafts L and $h$; on the shaft L I place the gear L' and on the shaft $h$ the pinion H; which turns the gear L' and the shaft L; near the top of the post A, A, A, A, I place two small shafts $o$ and $o$ parallel to the shaft L, on each end of the two shafts $o$ and $o$ I place the small grooved pulleys E, E, E, E—one pulley near the ends of each of the two shafts. On the outer side and near the bottom of one of the posts A I place a small pinion $p$ and pulley $n$; I connect the pulley $n$ with the pulley $m$, on the end of the shaft $h$, with the rope $f$ which may or may not be an endless rope; I construct the saw-gate C with iron heads and wooden sides, the head pieces have a slot in them the whole length through which the saw-bolts $g$, $g$, pass; I connect the saw-gate C with the shaft L by means of the ropes $r$, $r$, $r$, $r$, passing over the grooved pulleys E, E, E, E and fastened to the shaft L. It will now be seen that the saw-gate C is suspended between the posts A, A, A, A, and that it can partake of a reciprocating motion given to it by the driving rod $x$; and that by turning the crank $q$ attached to the pulley $n$ the saw-gate may be raised or lowered; for by turning the crank $q$ the shaft L is turned which takes up or lengthens the ropes $r$, $r$, $r$, $r$, and thus raises or lowers the saw-gate C; as the weight of the saw-gate should be sufficient to lower itself, it will only be necessary to raise the stop R from the pinion $p$ when we wish to lower the saw-gate C.

To each of the posts A, A, A, A, I attach two iron arms—one near the top and the other near the bottom of the posts—of rather more than half the length of the head pieces of the saw-gate C. To these arms I clamp the adjustable guide bars $y$, $y$, $y$, $y$, with the clamps I I I I, &c., or with the common clamp shown in Fig. 4; I construct the saws S and S' in the usual manner with a square hole near the ends of the saws, through which the saw bolts $g$, $g$ take hold of the saws; I make the saw bolts of round iron and form a square hook on the end that holds the saw, the saw-bolts pass through the head of the saw-gate C and the head D of the guide rod $d$; I strain the saws by means of a nut on the end of the saw-bolt $g$ or by means of a key passing through the bolt $g$, and hold them in the direction of the lines to be cut by means of set screws passing through D, the head of the guide rod $d$, and taking hold of the saw-bolt $g$; I attach the saws to the adjustable guide bars $y$, $y$, $y$, $y$, by means of the guide rods $d$, $d$, and the slides Z, Z, Z, Z; the guide rod $d$ is made of round iron and bent twice at right angles so as to pass through the slides Z, Z, which are attached to the adjustable guide bars $y$, $y$, and allow the heads D, D, to be screwed on each end; the length of the guide rod $d$ from the head D to the angle is such as will allow the saw S to have any position from the side of the saw-gate to its center; the head D, contains two small friction rollers $u$, $u$ between which the saw bolt $g$ passes; these friction rollers allow the saws to be moved toward or from each other when strained.

On the guide rod $d$ I place two slides Z, Z, between the two angles of the rod, through which slides the adjustable guide bars $y$, $y$, $y$, $y$, also pass. The construction of the slide Z is shown in Fig. 6. It should be made in two parts so that it may be removed from the guide rod $d$ if necessary. On each corner of the saw gate $c$ I bolt a box ($a$) through which the guide rods $d$, $d$, pass. It will now be seen that the guide rods $d$, $d$, have the same motion as the saw gate C has, and as the saw-gate C is lowered the adjustable guide bars will spread the saws $s$ and $s'$ since the slides Z, &c., must follow the bars $y$, $y$, $y$, $y$. A supply of water may be furnished by suspending a trough with numerous holes, with plugs, just below the shaft L which trough can be supplied with water by means of a pipe from some reservoir.

We will now suppose that the machine is in readiness for use and that M be a block of marble from which we wish to cut the wedge contained between the lines $w\ l$ and $t\ p$. Bring the saw-gate C down to the block M, now strain the saw S over the line $w\ l$ with its side in the direction of that line by means of the key in the saw-bolt $g$, tighten up the set screw in the head D of the guide rod $d$, adjust the saw S′ in the same manner over the line $t\ p$; now pass the adjustable guide bars through the slides Z, Z, Z, Z, on the guide rods $d$, $d$, and clamp those of the slides Z Z attached to the guide rod $d$ of the saw S parallel to the line $w\ l$ and clamp the other two guide bars attached to the saw S′ parallel to the line $t\ p$; now cover the top of the block M, with sand, loosen the plugs in the water trough, attach the driving rod $x$, and raise the stop $k$ from the pinion $p$. Now the saw-gate has a reciprocating motion over the block M, and its weight causes the saws S and S′ with the aid of the sand to cut the block M, and as they cut it the saw-gate will fall and as it falls the adjustable guide bars $y$, $y$, $y$, $y$, which are clamped to the arms $b$, $b$, &c., will spread the saws S and S′. If at any time a section be made in the block M, the saws S and S′ will be found to be situated with respect to each other as shown in Fig. 5, being held in this position by means of the set screws through the heads D, D, D, D. If the guide bars $y$, $y$, $y$, $y$, were oppositely inclined the saws S and S′ would approach each other. If the guide bars $y$, $y$, $y$, $y$, were removed and the kind used shown in Fig. 7 the saws S and S′ would both approach and recede from each other as they cut the block M. We may place two or more blocks under the saws and cut therefrom two or more wedges at the same time as shown by M, M′, and M″ in Fig. 2. To cut four sides at the same time it is necessary to arrange a second saw-gate in precisely the same manner as we have arranged the saw-gate C and working between the other inner sides of the posts A, A, A, A. By removing the saw-bolts, $g$, &c., the boxes $a$, $a$, $a$, $a$, and unclamping the adjustable guide bars $y$, $y$, $y$, $y$, the guide rods $d$, $d$, may be removed and then we have left a proper machine for holding and working a gang of saws for sawing parallel slabs from a block of marble.

I do not claim the manner of suspending and driving the saw-gate, nor the method used for raising the same, nor the mode of supplying water to the saws, nor the use of adjustable guide bars, guide rods and slides for these have been long known and much used. But What I do claim as my invention, and desire to secure by Letters Patent of the United States, is—

The use of adjustable guide bars, guide rods and slides on the guide bars, or their equivalents substantially as described in combination with the slides carrying the saws and for the purpose specified.

JOHN M. MOTT, JR.

Witnesses:
JOHN M. MOTT,
JOHN S. HOLLINGSHEAD.